United States Patent [19]

Bandoh

[11] Patent Number: 5,247,649
[45] Date of Patent: Sep. 21, 1993

[54] MULTI-PROCESSOR SYSTEM HAVING A MULTI-PORT CACHE MEMORY

[75] Inventor: Tadaaki Bandoh, Ibaraki, Japan

[73] Assignee: Hitachi, Ltd., Tokyo, Japan

[21] Appl. No.: 933,892

[22] Filed: Aug. 24, 1992

Related U.S. Application Data

[63] Continuation of Ser. No. 347,222, May 4, 1989, abandoned.

[30] Foreign Application Priority Data

May 6, 1988 [JP] Japan .................. 63-109045

[51] Int. Cl.⁵ .................. G06F 12/08; G06F 13/00; G11C 7/00
[52] U.S. Cl. .................. 395/425; 365/49; 365/230.05; 364/DIG. 1; 364/243.41; 364/243.42
[58] Field of Search ......... 364/DIG. 1, 243.4, 243.42, 364/229, 230.5, 230.6, 244.8; 395/425; 365/49, 230.05

[56] References Cited

U.S. PATENT DOCUMENTS

| | | | |
|---|---|---|---|
| 4,141,067 | 2/1979 | McLagan | 364/200 |
| 4,158,235 | 6/1979 | Call et al. | 364/49 X |
| 4,426,681 | 1/1984 | Bacot et al. | 364/200 |
| 4,577,293 | 3/1986 | Matick et al. | 365/189.04 |
| 4,616,310 | 10/1986 | Dill et al. | 365/189.04 X |
| 4,740,894 | 4/1988 | Lyon | 364/200 |
| 4,783,732 | 11/1988 | Morton | 365/230.05 X |
| 4,783,736 | 11/1988 | Ziegler et al. | 364/200 |
| 4,794,521 | 12/1988 | Ziegler et al. | 395/425 |
| 4,797,814 | 1/1989 | Brenza | 395/425 |
| 4,825,356 | 4/1989 | Lenoski | 364/DIG. 1 |
| 4,891,794 | 1/1990 | Hush et al. | 365/230.05 X |
| 4,930,066 | 5/1990 | Yokota | 364/DIG. 1 |
| 4,967,398 | 10/1990 | Jamoua et al. | 365/230.05 |
| 4,975,872 | 12/1990 | Zaiki | 365/230.05 X |
| 5,014,247 | 5/1991 | Albachten | 364/230.05 |
| 5,025,365 | 6/1991 | Mathur et al. | 364/DIG. 1 |
| 5,056,002 | 10/1991 | Watanabe | 364/DIG. 1 |

FOREIGN PATENT DOCUMENTS

| | | |
|---|---|---|
| 1207916 | 7/1986 | Canada . |
| 1223973 | 7/1987 | Canada . |
| 1259140 | 5/1989 | Canada . |
| 0100943 | 2/1984 | European Pat. Off. . |
| 0125855 | 11/1984 | European Pat. Off. . |
| 0284751 | 10/1988 | European Pat. Off. . |
| 3803759A1 | 8/1988 | Fed. Rep. of Germany . |
| 56-127261 | 10/1981 | Japan . |
| 57-30169 | 2/1982 | Japan . |

OTHER PUBLICATIONS

"Using Cache Memory to Reduce Processor-Memory Traffic" 10th Annual International Symposium on Computer Architecture vol. 11, No. 3 Jun. 13-17 1983: pp. 124-131 by James R. Goodman.

IBM-TDB Shared Instruction and/or Data Caches in a Multi-Processing System vol. 27, No. 12 May 1985 pp. 6845-6846.

*Primary Examiner*—Alyssa H. Bowler
*Attorney, Agent, or Firm*—Antonelli, Terry, Stout & Kraus

[57] ABSTRACT

A multi-port cache memory of multi-port memory structure is connected to and shared with a plurality of processors. The multi-port cache memory may have two sets of interface signal lines, for instruction fetch and for data read/write, to each processor. The multi-port cache memory may also be used only for data read/write. The system performance is further improved if a plurality of processors and a multi-port cache memory are fabricated on a single LSI chip.

14 Claims, 7 Drawing Sheets

FIG. 6

| TYPE | FUNCTION |
| --- | --- |
| INTERRUPTION | · DESIGNATING PROCESSOR NO.<br>· ALL<br>· ANYONE |
| CONTROL | · WAIT<br>· START (ADDRESS DESIGNATED |
| LOCK | · CONFLICT CONTROL FOR COMPARE & SWAP |

MULTI-PROCESSOR SYSTEM HAVING A MULTI-PORT CACHE MEMORY

This application is a continuation of Ser. No. 347,222, filed May 4, 1989, now abandoned.

BACKGROUND OF THE INVENTION

The present invention relates to a multi-processor system, and more particularly to a multi-processor system having a multi-port cache memory which is shared with a plurality of processors.

A multi-processor system using a plurality of microprocessors is now being developed extensively. For example, there is disclosed in JP-A-56-127261 a system having a plurality of processors connected via busses, each processor having its own cache memory in order to attain high performance and reduce bus traffic. Prior to accessing main memory in this system, each processor first accesses its associated cache memory, and only when a miss occurs, the main memory is accessed via a bus.

The problem associated with such a system concerns the coherence control of cache memories. The coherence control is effected so as to make the contents of cache memories of all processors always coincident with each other. In the system of the above-referenced JP-A-56-127261, a write-through type cache memory system is used wherein, when data is written in a cache memory and the main memory, the write address thereof is supplied to the other cache memories so that the contents of the other cache memories at the same address are made invalid.

Use of such write-through type cache memories results in a high frequency of write operations into the main memory. In order to further reduce the write operation frequency, algorithms using write-back type cache memories, more improved write-once type cache memories, or the like have been developed. The details of these algorithms are discussed in James R. Goodman "USING CACHE MEMORY TO REDUCE PROCESSOR—MEMORY TRAFFIC", The 10th Annual International Symposium on COMPUTER ARCHITECTURE, Vol. 11, No. 3, Jun., 13–17, 1983.

Cache memories of the above-described types are suitable for those systems executing parallel processings of coarse grain units, such as task or process units. However, parallel processings of fine grain units such as subroutines or modules are associated with a problem that data to be shared with processors become large. A larger amount of shared data results in frequent invalidations of data in cache memories upon a data write operation into the main memory, and in a low hit rate at each cache memory.

The above system configurations have been realized aiming at reducing signal lines for linkage among processors each provided in one LSI chip. However, these configurations will not become optimum if a plurality of processors are fabricated in one LSI chip by employing an ultra very LSI technology.

SUMMARY OF THE INVENTION

It is therefore an object of the present invention to provide a multi-processor system having a cache memory suitable for parallel processing of smaller data by each processor.

With the above object of this invention, the system performance is not degraded even if write operations for shared data are frequently carried out.

It is another object of the present invention to provide a multi-processor system suitable for use with an ultra very LSI chip in which a plurality of processors can be fabricated.

The structural aspect of the present invention resides in that a plurality of processors and a multi-port cache memory are fabricated in a single LSI chip. A multi-port cache memory is constructed of a single data storage area and a plurality of data read/write ports. Therefore, all processors refer to the same data stored in the memory, with immediate reflection of a write operation by any one of the processors. Contrary to this, a conventional system uses a plurality of cache memories so that if one of the processors writes data in an associated cache memory, the corresponding contents of the cache memories of the other processors should be made invalid, hence degrading the system performance. The present invention can overcome such disadvantages.

BRIEF DESCRIPTION OF THE DRAWINGS

FIG. 6 shows the functions of LINK;

DESCRIPTION OF THE PREFERRED EMBODIMENTS

Figure 1:
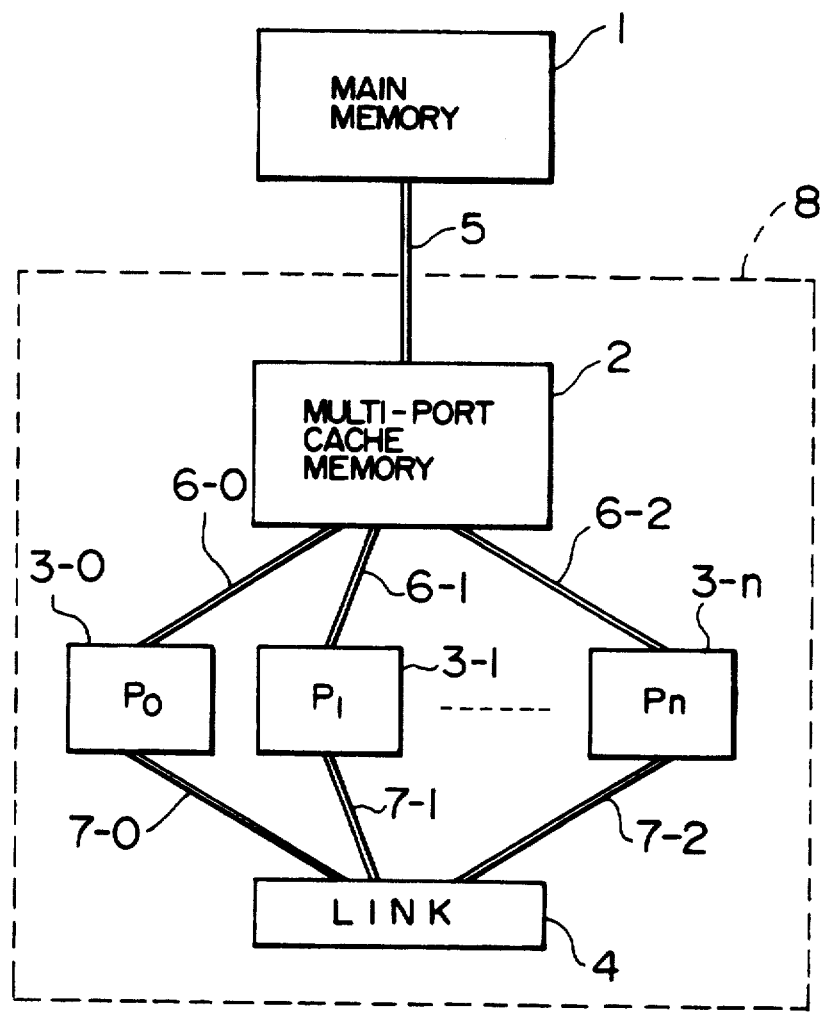
FIG. 1 is a schematic block diagram showing an embodiment of a multi-processor system according to the present invention.

The configuration of a multi-processor system of this invention is shown in FIG. 1. A plurality of processors P0 to Pn (3-0 to 3-n) are fabricated in a single LSI chip 8 and use in common a multi-port cache memory 2. The operation of the cache memory 2 is the same as that of a general cache memory. Namely, if a memory access by a processor is a hit, then data in the cache memory is accessed. Alternatively, in the case of a mishit, the main memory is accessed, and the data is stored in the cache memory and also sent back to the processor.

Figure 2:
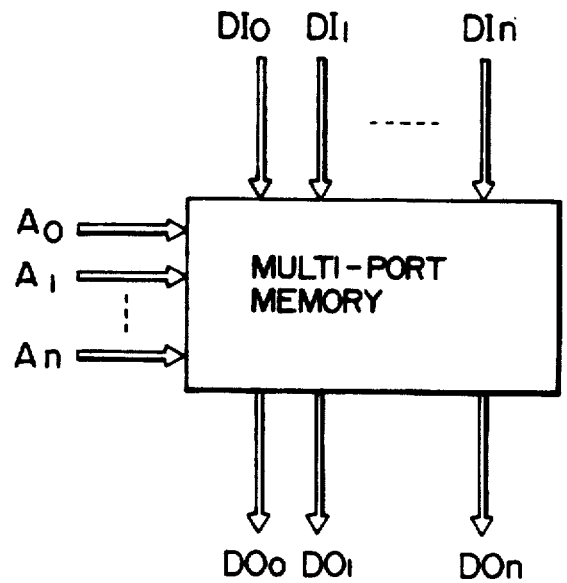
FIG. 2 is a schematic diagram showing an example of a multi-port memory.

As shown in FIG. 1, a multi-port memory is used as cache memory. FIG. 2 shows the structure of a multi-port memory. The multi-port memory has interface signals constituted by a plurality of sets of address signals A0 to An (each set is constructed of a plurality of address lines), a plurality of sets of input data signals DI0 to DIn (each set is constructed of a plurality of data lines), a plurality of sets of output data signals DO0 to DOn (each set is constructed of a plurality of data lines) and control signals (not shown) such as a write enable signal. Thus, the multi-port cache memory 2 is considered as an independent memory as seen from each processor. Specifically, processor P0 can write data from DI0 in the memory and read data in the memory via DO0 at designated address A0.

Figure 3:
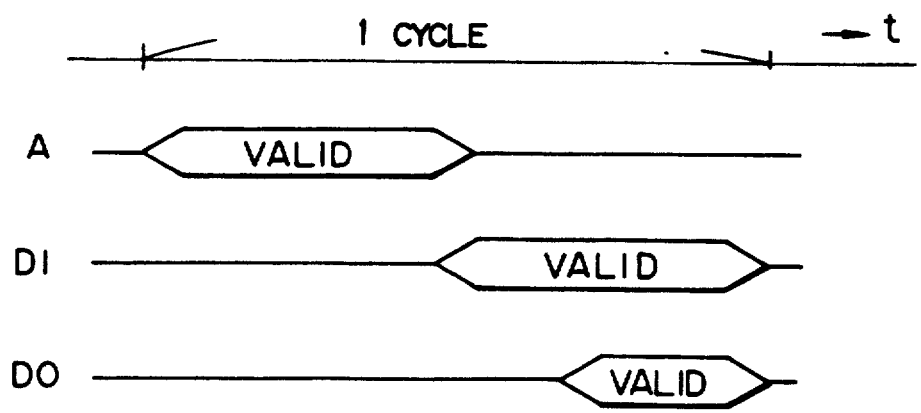
FIG. 3 is a timing chart illustrating the operation of the multi-port memory shown in FIG. 2.

Data read/write operations at respective ports are carried out synchronously with each other, the timings of which are shown in FIG. 3. If a plurality of processors access data at the same address, the same data is read and supplied to the processors. If read and write operations are designated at the same address A, data D0 at the address is first read and thereafter, new data DI is written at the address. If a plurality of write operations are designated at the same address, the write operations are executed in the order of higher priority among the addresses A0 to An under control of a priority control circuit.

Figure 4:
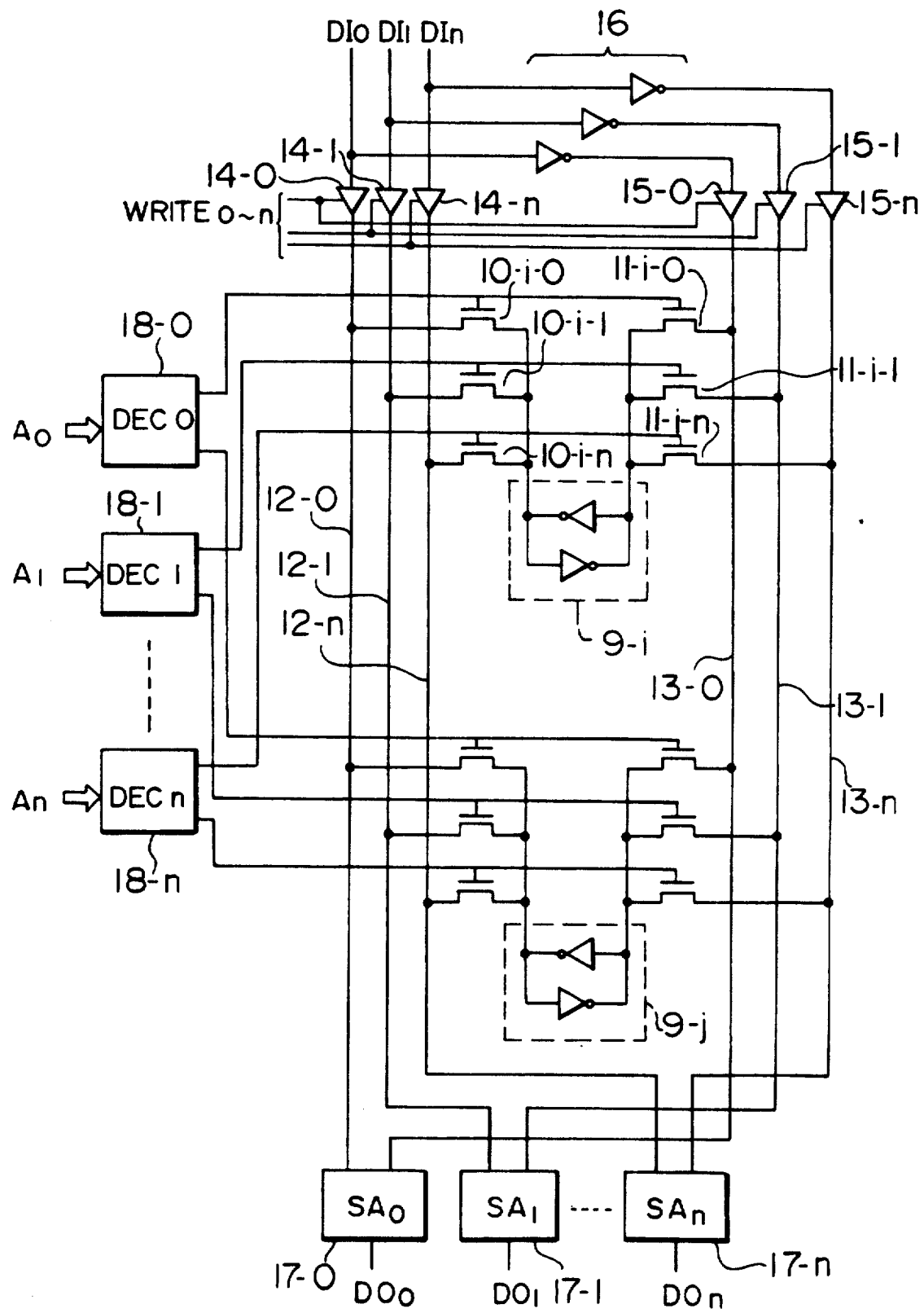
FIG. 4 is a circuit diagram showing an example of the circuit arrangement of a multi-port memory.

The circuit arrangement of a multi-port memory is shown in FIG. 4. Information is stored in a memory cell indicated at 9-$i$, 9-$j$.

In a data read operation, gates 14-0 to 14-$n$ and gates 15-0 to 15-$n$ are closed since all lines WRITE 0-$n$ are disabled. In the case of an access from address A0 for example, address A0 is decoded at a decoder DECO 18-0 and gates 10-$i$-0 and 11-$i$-0 are opened so that information in the memory cell 9-$i$ is read out onto bit lines 12-0 and 13-0 which are then amplified at a sense amplifier SA0 17-0 and outputted from port D00.

Similarly, in the case of an access from address A1, information is outputted via a sense amplifier SA1 from port DO1, and in the case of an access from address An, information is outputted via a sense amplifier SAn from port DOn.

In a data write operation, data from DI0 is applied to a gate 14-0, and after inversion at an inverter 16 to a gate 15-0. Upon reception of a write signal WRITE 0, the gates 14-0 and 15-0 are opened so that data of opposite polarities are transferred onto bit lines 12-0 and 13-0 and written into a memory cell 9-$i$ via gates 10-$i$-0 and 11-$i$-0. 10-$i$-0 and 11-$i$-0.

If read and write operations are designated for the same memory cell, e.g., if a read operation is designated by address A0 and a write operation is designated by address A1, data is first read from the memory cell and applied to sense amplifier SA0 and thereafter, write signal WRITE 1 becomes true to open gates 14-0 and 15-0 and conduct a write operation.

Figure 5:
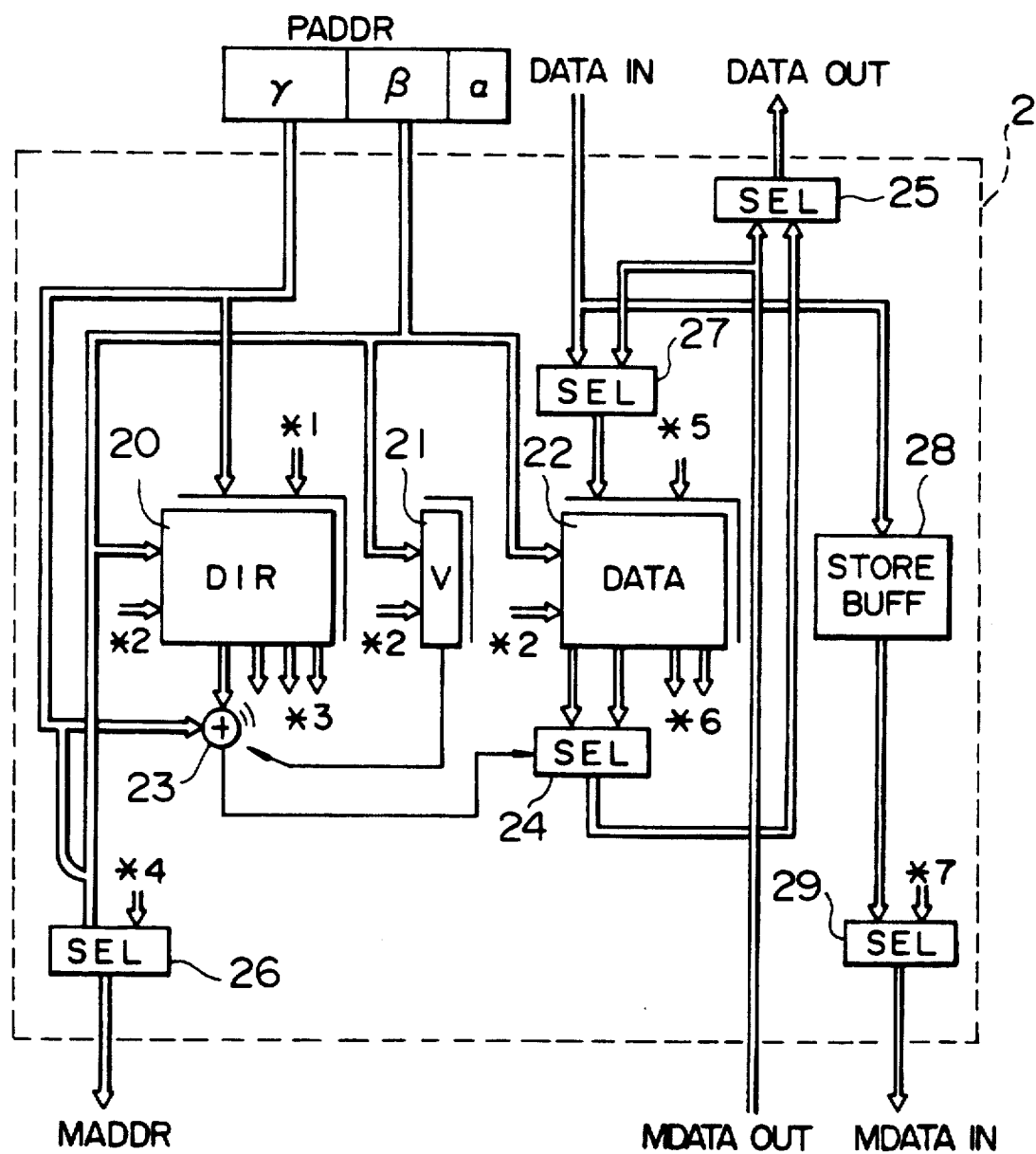
FIG. 5 is a schematic block diagram showing an embodiment of a cache memory using a multi-port cache memory.

The structure of a cache memory 2 using multi-port memories is shown in FIG. 5. An address to access the cache memory 2 from a processor is designated by PADDR. This cache memory is of a set associative type. The field α in PADDR represents an address in an address block in the cache memory 2, and a column address of the cache memory 2 is represented by $\beta$ field in PADDR.

A directory (which may be called "tag") DIR 20 stores therein the contents indicating which data of the address blocks are stored in the cache memory 2. DATA 22 is an area for storing cache data. The $\beta$ field within PADDR sent from a processor is used for access to DIR 20. The access result is compared with the $\gamma$ field within PADDR at 23. The contents corresponding in number to the number of sets are read from DIR 20. If any one of the read-out contents has the same value as $\gamma$, it means that the access is a hit. Bits V 21 indicate whether the entries of DIR 20 are valid or invalid. The contents corresponding in number to the number of sets are also read from DATA 22 using the $\beta$ field within PADDR as their address. Data corresponding to the hit set are selected by a selector SEL 24 and sent via a selector 25 to the processor as data DATAOUT.

If the cache memory is not hit, address fields $\gamma$ and $\beta$ are transferred via a selector 26 to the main memory. In writing data into the main memory, data DATAIN supplied from a processor is written in DATA 22 of the cache memory 2 via a selector 27, and also in a store buffer 28 and then into the main memory via a selector 29. In this embodiment, a store-through type cache memory is used.

In FIG. 5, reference numerals with an asterisk represent interfaces with other processors. Namely, the $\gamma$ fields from other processors (hereinafter indicated by $\gamma'$ field) are supplied to *1' and the $\beta$ fields within PADDR from other processors (hereinafter indicated by $\beta'$ field) are supplied to *2. The corresponding read-out contents are represented by *3 which are compared with $\gamma'$. If they are coincident with each other, the accesses are considered as hits so that the read-out data *6 is selected. $\beta'$ and Y' from other processors are inputted to *4. Outputs from store buffers of other processors are supplied to *7. The output of the selector 27 of other processors is supplied to *5.

Multi-port memories are used for DIR 20, V21 and DATA 22 so that a plurality of processors can access the cache memory 2 at the same time.

FIG. 6 shows the functions of LINK which is a device for interconnecting processors constituting a multiprocessor system.

There are three interruption functions, i.e., an interruption while designating the number of a processor, an interruption while broadcasting to ALL processors, and an interruption allowing ANYONE of processors to accept.

Control functions include various operations so as to efficiently execute parallel processings. They are a WAIT control for waiting for a start signal from another processor, a START control for releasing the WAIT control, and other controls. The START control can be executed while designating an execution start address.

A lock function is used for subjecting the cache memory to a Test and Set operation and a Compare and Swap operation. In the Compare and Swap operation, data in the memory is read and the value of read-out data is checked, and then a data write operation to the memory may be carried out in accordance with the check result. During the Compare and Swap operation by a processor, it is necessary that other processors not to execute the Compare and Swap operation at the same address.

For this reason, prior to executing a Compare and Swap operation, each processor sends a Compare and Swap execution request to LINK. If the request is acknowledged, then the Compare and Swap operation is executed and thereafter the request is cancelled. If a plurality of requests are sent from processors, LINK allows only one request to be executed.

The multi processor system using a multi-processor-on-chip having a plurality of processors, a multi-port cache memory and LINK has been described above. Use of this multi-port cache memory allows a system high performance not realized in a conventional system having frequent invalidations and performance degradation in preserving coherence.

Figure 7:
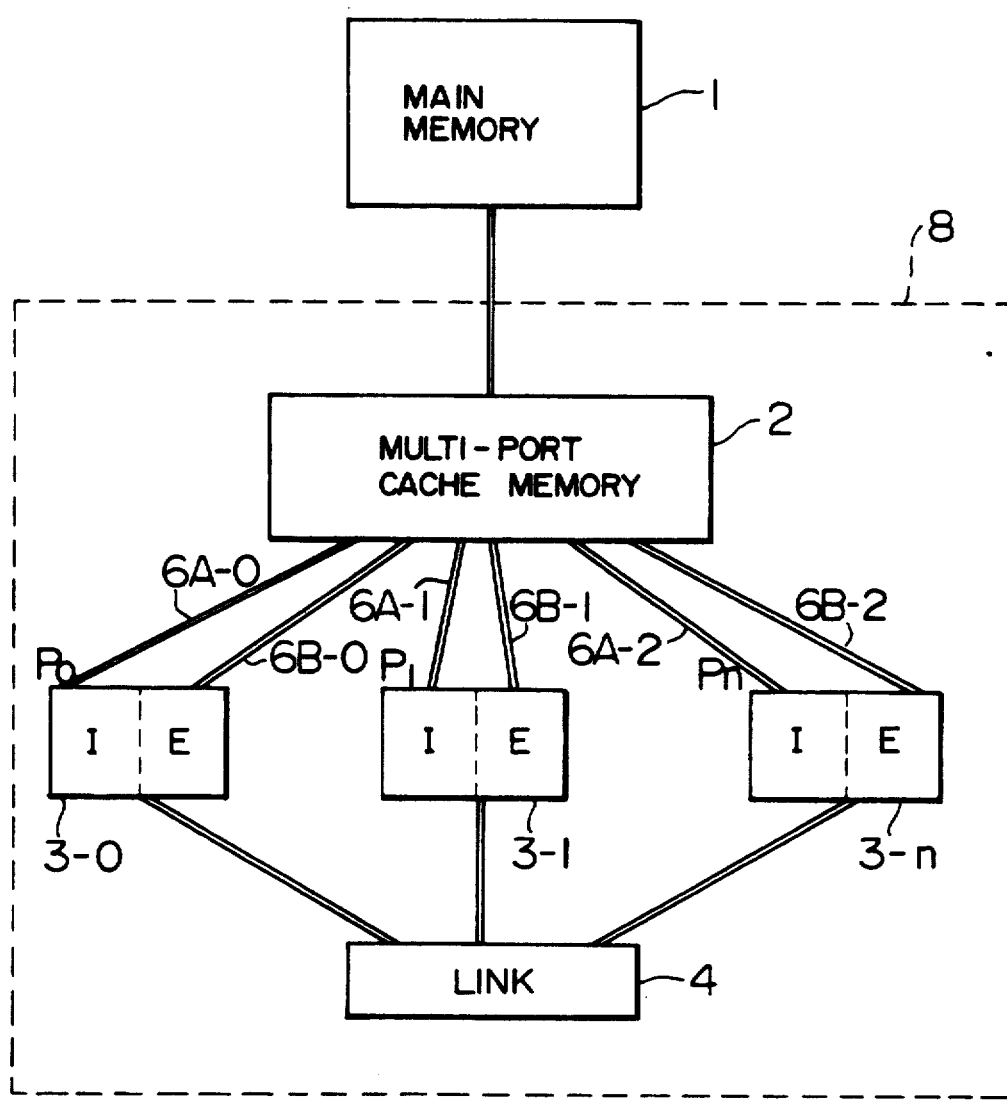
FIG. 7 is a schematic block diagram showing a second embodiment of the multi-processor system using a multi-port cache memory according to the present invention.

FIG. 7 shows a modification of a multi-port cache memory. A recent high performance processor controls instruction execution by using a multi-stage pipeline. A typical example of dividing an instruction execution includes an instruction fetch (IF), decode (D), address translation (A), operand fetch (OF) and execution (E). Memory access is carried out two times, i.e. at the instruction fetch cycle and operand fetch cycle. In executing the two cycles in parallel, two sets of interfaces are required for a multi-port cache memory. FIG. 7 shows the system configuration for such use. Two sets of interfaces 6A-0 and 6B-0, respectively for instruction/operand fetch (data read/write), are used instead of one set 6-0 shown in FIG. 1.

Figure 8:
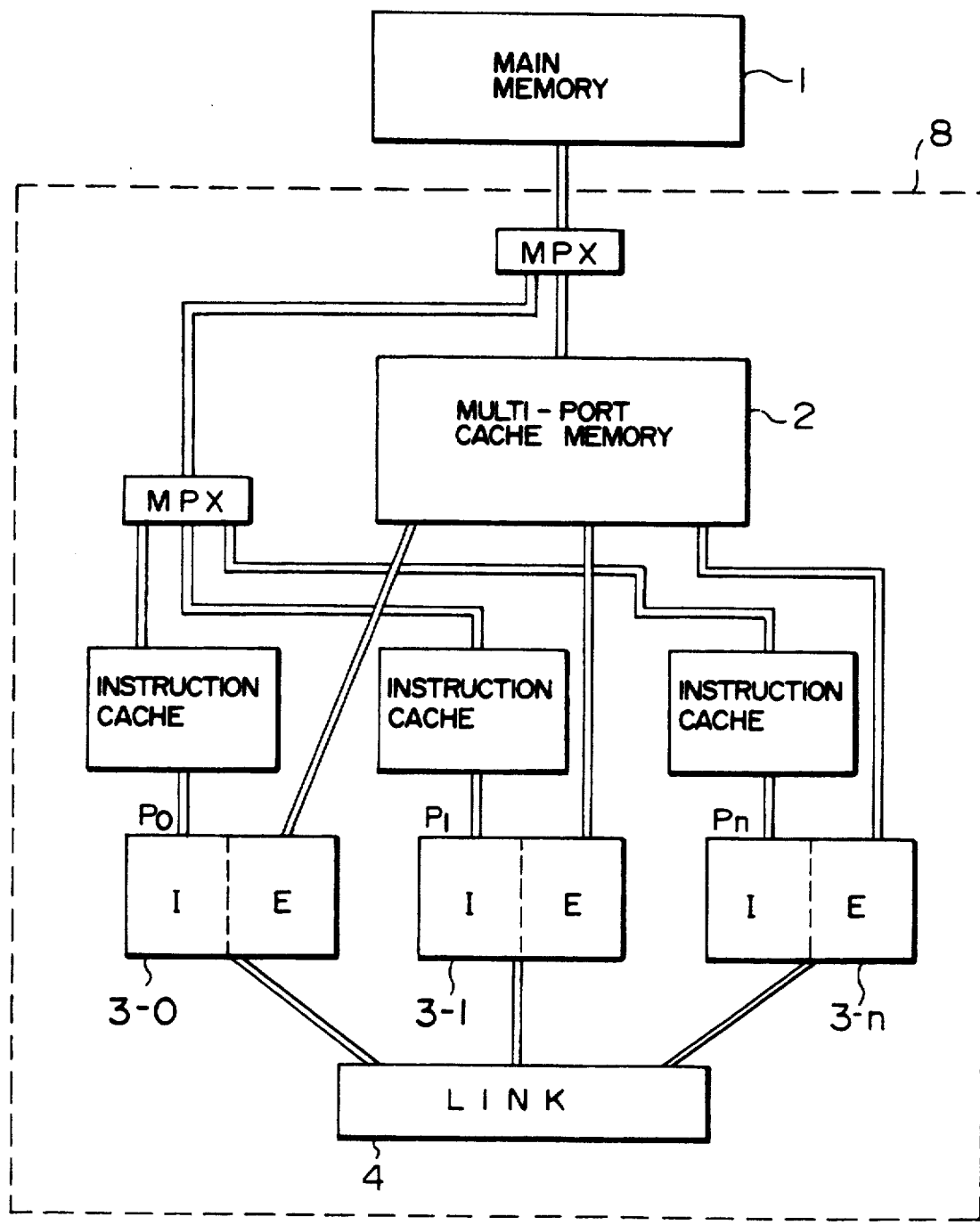
FIG. 8 is a schematic block diagram showing a third embodiment of the multi-processor system using a multi-port cache memory according to the present invention.

FIG. 8 shows another modification of a multi-port cache memory, wherein each processor has its own cache memory for instructions, and a multi-port cache memory shared with all processors is used only for operands. The reason for this is that an instruction generally involves pure procedure, and so, there is no need for rewriting it; thus, there is no need of using a multi-port cache memory for instructions.

A multi-port cache memory has a number of writings and a large area as compared with its memory capacity. Therefore, a multi-port cache memory is less cost effective than a single port cache memory. The system configuration shown in FIG. 8 accordingly has a multi-port cache memory which is used only for minimum necessary data.

I claim:

1. A multi-processor system comprising:
   a plurality of processors, each having a set of address/data interface signal lines; and
   a multi-port cache memory shared by said plurality of processors, said cache memory having a plurality of ports, each port being connected to a set of address/data interface signal lines of a respective one of said plurality of processors, and said cache memory also having a plurality of memory cells each being connected to all of said ports and being accessed by all of said plurality of processors by way of said sets of address/data interface signal lines, thereby allowing a read/write operation of each of said memory cells by all of said plurality of processors.

2. A multi-processor system according to claim 1, wherein said plurality of processors and said multi-port cache memory are fabricated on a single LSI chip.

3. A multi-processor system comprising:
   a plurality of processors, each having a first set of address/data interface signal lines for instruction fetch and a second set of address/data interface signal lines for operand fetch;
   a plurality of instruction cache memories for storing instructions, each of said instruction cache memories being connected to a respective one of said first set of address/data interface lines of said plurality of processors; and
   a data cache memory shared by said plurality of processors, said data cache memory having a plurality of ports, each port being connected to a second set of address/data interface signal lines of a respective one of said plurality of processors, and said data cache memory also having a plurality of memory cells each being accessed by said plurality of processors by way of said second sets of address/data interface signal lines, thereby allowing a read/write operation of each of said memory cells by said plurality of processors in common.

4. A multi-processor system according to claim 3, wherein said plurality of processors and said multi-port cache memory are fabricated on a single LSI chip.

5. A multi-processor system comprising:
   a plurality of processors, each having a first set of address/data interface signal lines for instruction fetch and a second set of address/data interface signal lines for operand fetch; and
   a multi-port cache memory shared by said plurality of processors, said cache memory having a plurality of ports, each port being connected to a first set of address/data interface signal lines and a second set of address/data interface signal lines of a respective one of said plurality of processors, and said cache memory also having a plurality of memory cells each being connected to all of said ports and being accessed by said plurality of processors by way of said first and second sets of address/data interface signal lines, thereby allowing a read/write operation of each of said memory cells by plural processors independently of each other between instruction fetch and operand fetch.

6. A multi-processor system according to claim 5, wherein said plurality of processors and said multi-port cache memory are fabricated on a single LSI chip.

7. A multi-processor system comprising:
   a plurality of processors, each processor having a set of address lines and data lines; and
   a single multi-port cache memory connected to said processors via said sets of address lines and data lines, and having a plurality of memory cells, a plurality of address decoders equal to the number of said processors for addressing said memory cells and a plurality of read/write data lines equal to the number of said processors;
   wherein each of said address decoders is connected to a respective set of address lines of said plurality of processors; each of said read/write data lines is connected to a set of data lines of a respective one of said plurality of processors; and each of said memory cells is provided with a set of gate means, each gate means being connected to a respective one of said read/write data lines and being on-off controlled by a respective one of said address decoders so as to selectively connect that memory cell to one of said read/write data lines.

8. A multi-processor system comprising:
   a plurality of processors, each having a first set of address lines and data lines for instruction fetch, and a second set of address lines and data lines for operand fetch; and
   a single multi-port cache memory having a first set of ports and a second set of ports connected to said first set of address lines and data lines and second set of address lines and data lines, respectively, and also having a plurality of memory cells, a number of address decoders equal to the number of said processors for each set of ports and a number of read/write data lines equal to the number of said processors for each set of ports;
   wherein each of said address decoders is connected to a respective set of address lines of said plurality of processors for each set of ports;
   each of said read/write data lines being connected to a set of data lines of a respective one of said plurality of processors for each set of ports;
   each of said memory cells being addressed by said address decoders for each set of ports; and each of said memory cells for each port being provided with a set of gate means, each gate means being connected to a respective one of said read/write data lines and being on-off controlled by one of said address decoders so as to selectively connect that memory cell to one of said read/write data lines.

9. A multi-processor system comprising:

a plurality of processors, each having a first set of address lines and data lines for instruction fetch, and a second set of address lines and data lines for operand fetch;

a plurality of instruction cache memories for storing instructions, each of said instruction cache memories being connected to each first set of address lines and data lines of said plurality of processors; and a data multi-port cache memory connected to said processors via said second sets of address lines and data lines, and having a plurality of memory cells, a number of address decoders equal to the number of said processors and a number of read/write data lines equal to the number of said processors;

wherein each of said address decoders is connected to a respective second set of address lines of said plurality of processors;

each of said read/write data lines is connected to a respective second set of data lines of said plurality of processors;

each of said memory cells is addressed by said address decoders; and each of said memory cells is provided with a set of gate means, each gate means being connected to a respective one of said read/write data lines and being on-off controlled by one of said address decoders so as to selectively connect that memory cell to one of said read/write data lines.

10. A multi-processor system comprising:

a plurality of processors, each having a set of address/data interface signal lines; and a single multi-port cache memory for storing a portion of data stored in a main memory and having a number of cells and a plurality of ports each accessible to all of said number of cells, each port being connected to a set of address/data interface signal lines of a respective one of said plurality of processors.

11. A multi-processor system according to claim 10, wherein each of said cells of said cache memory is connected to all of said ports.

12. A multi-processor system comprising:

a plurality of processors, each having a first set of address/data interface signal lines for instruction fetch and a second set of address/data interface signal lines for operand fetch; and a single multi-port cache memory for storing both instructions and operand data, said single cache memory having a number of cells and a plurality of ports each accessible to all of said number of cells, each port being connected to a first set of address/data interface signal lines and a second set of address/data interface signal lines of a respective one of said plurality of processors.

13. A multi-processor system according to claim 12, wherein each of said cells of said cache memory is connected to all of said ports.

14. A multi-processor system comprising:

a plurality of processors, each having a first set of address lines and data lines for instruction fetch and a second set of address lines and data lines for operand fetch;

a plurality of instruction cache memories for storing instructions, each of said instruction cache memories being connected to each first set of address/data interface signal lines of said plurality of processors; and a single multi-port cache memory having a plurality of ports, each port being connected to a second set of address lines and data lines of a respective one of said plurality of processors.

* * * * *